United States Patent [19]

Joh et al.

[11] 4,125,468
[45] Nov. 14, 1978

[54] HOLLOW-FIBER PERMEABILITY APPARATUS

[75] Inventors: Yasushi Joh, Yokohama; Masahiro Yamazaki, Kamakura, both of Japan

[73] Assignee: Nippon Zeon Co., Ltd., Tokyo, Japan

[21] Appl. No.: 803,064

[22] Filed: Jun. 3, 1977

[30] Foreign Application Priority Data

Jun. 7, 1976 [JP] Japan .................................. 51-66305

[51] Int. Cl.$^2$ ............................................. B01D 31/00
[52] U.S. Cl. ............................ 210/321 B; 210/321 A; 210/456
[58] Field of Search ..................... 165/158; 210/321 R, 210/321 A, 321 B, 433 M, 456, 323 R; 55/16, 158; 23/258.5

[56] References Cited

U.S. PATENT DOCUMENTS

| | | | |
|---|---|---|---|
| 3,228,876 | 1/1966 | Mahon | 210/321 B X |
| 3,503,515 | 3/1970 | Tomsic | 210/321 |
| 3,616,929 | 11/1971 | Manjikian | 210/321 |
| 3,812,907 | 5/1974 | Linning | 165/158 X |
| 4,025,436 | 5/1977 | Tsuda et al. | 210/321 A |

Primary Examiner—Frank A. Spear, Jr.
Attorney, Agent, or Firm—McDougall, Hersh & Scott

[57] ABSTRACT

In a hollow-fiber permeability apparatus, a permeating region of a housing contains a bundle of hollow fibers, and materials can selectively permeate through the membranes formed by the permeable walls of the hollow fibers, between a first fluid flowing along the exteriors of the hollow fibers, and another fluid flowing the interiors of the hollow fibers. The apparatus includes at least one first opening and at least one second opening for passing the first fluid, formed in both end portions of the housing; an enlarged cross-section portion formed between the first and second openings and surrounding substantially the whole circumferential surface of the bundle of hollow fibers in the housing; and at least one third opening for passing the first fluid, connected to the enlarged cross section portion, said first and second openings being used as a fluid inlet opening, and the third opening being used as a fluid outlet opening, or the first and second openings being used as the fluid outlet opening, and the third opening being used as the fluid inlet opening.

22 Claims, 16 Drawing Figures

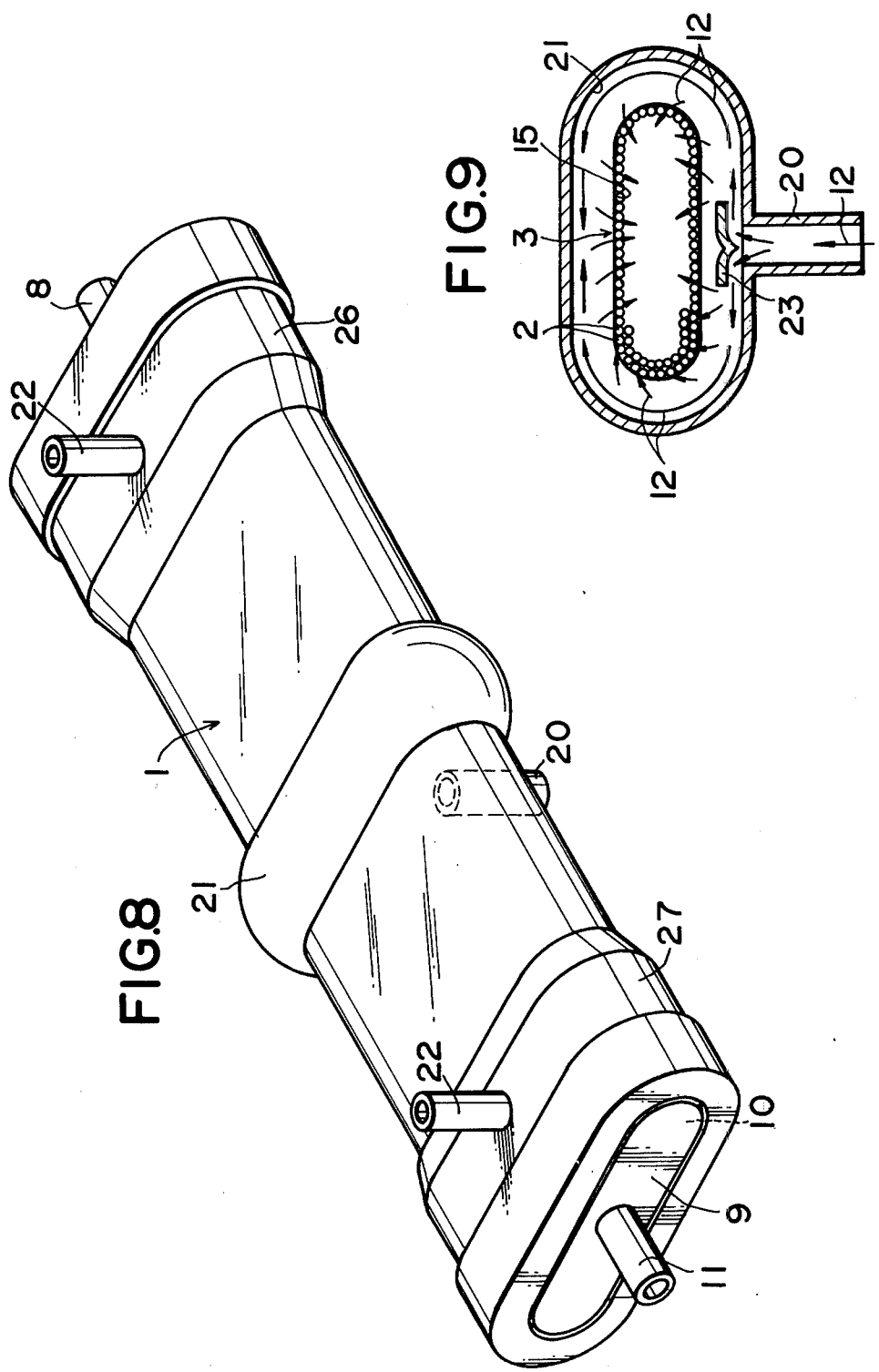

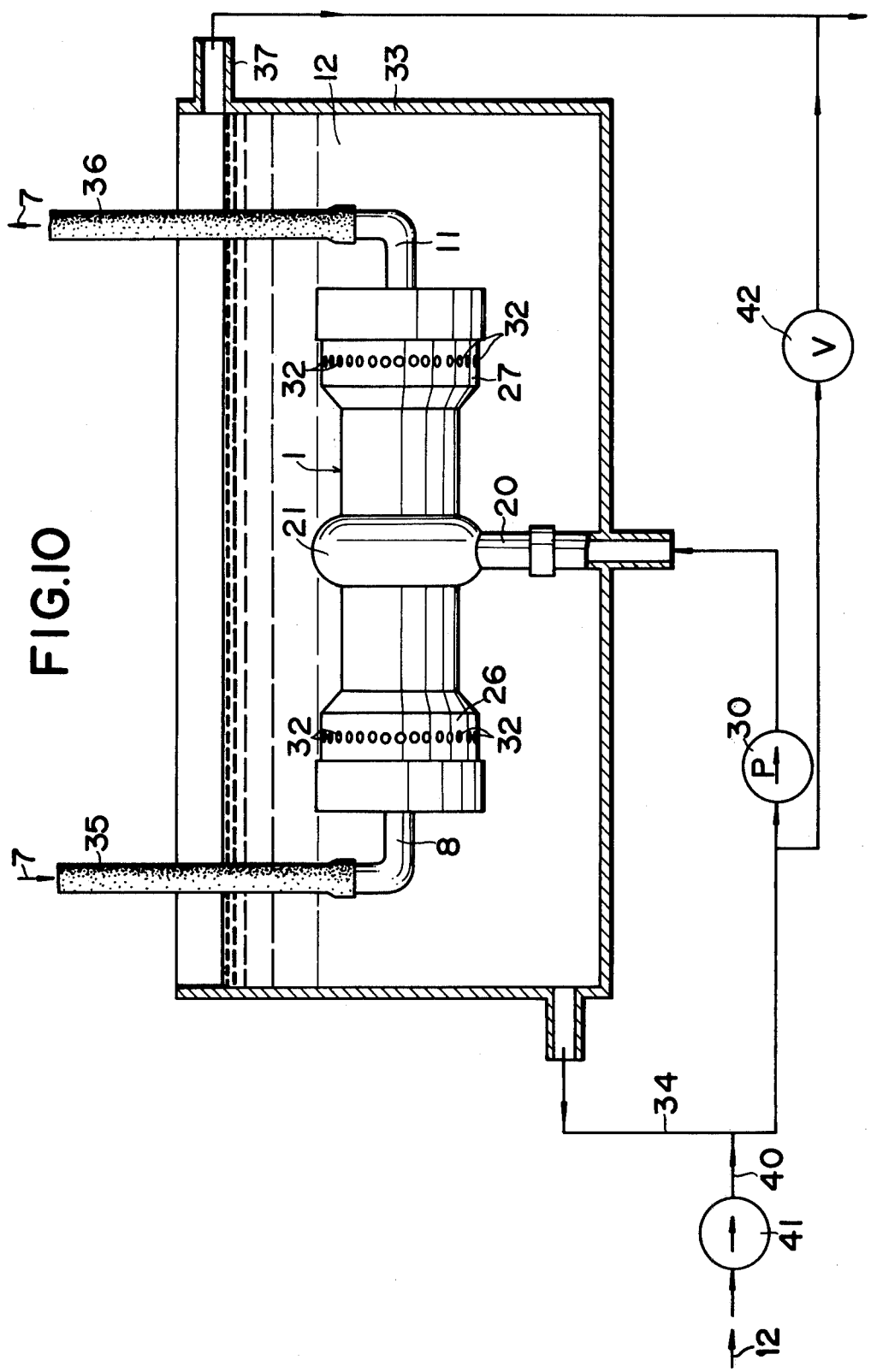

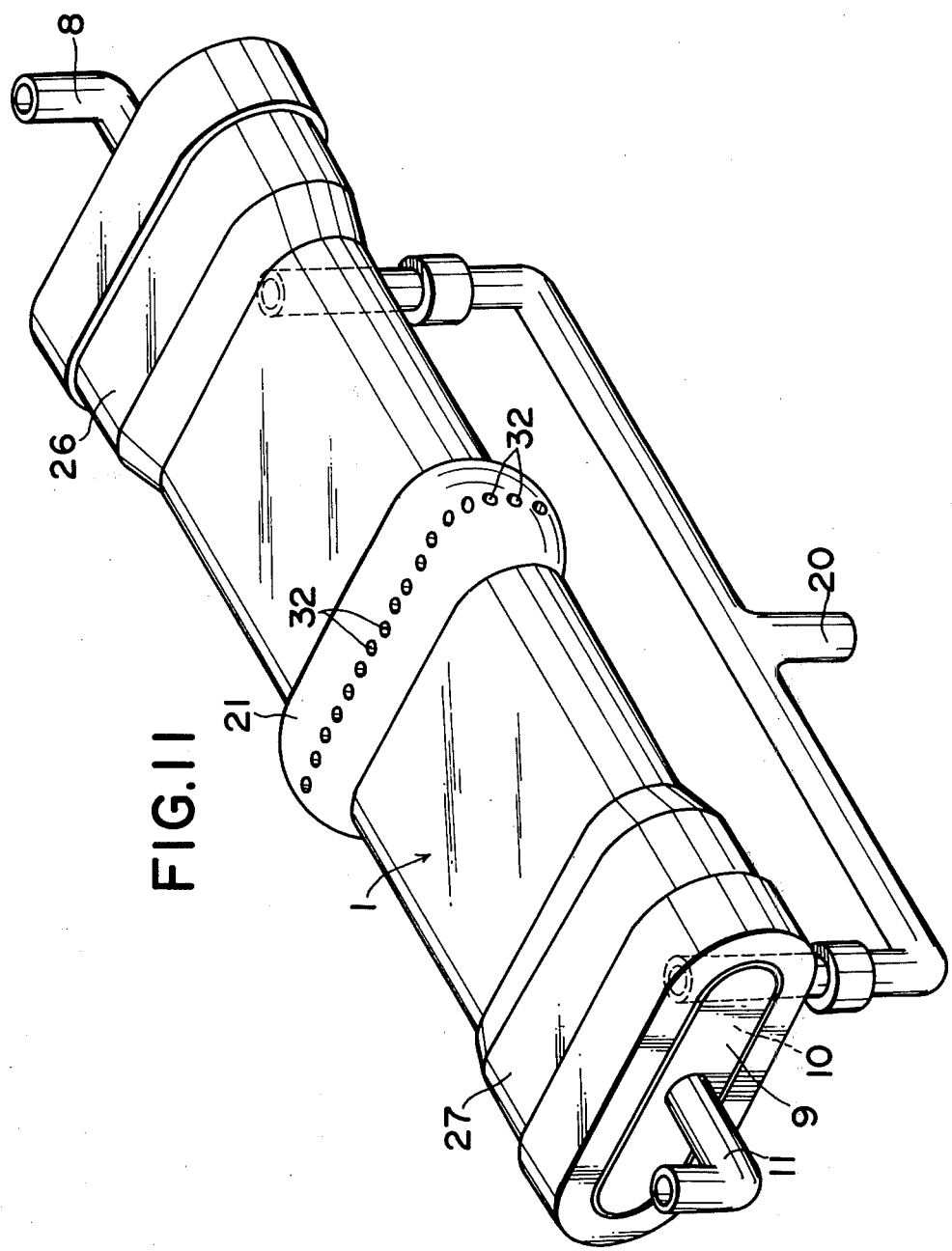

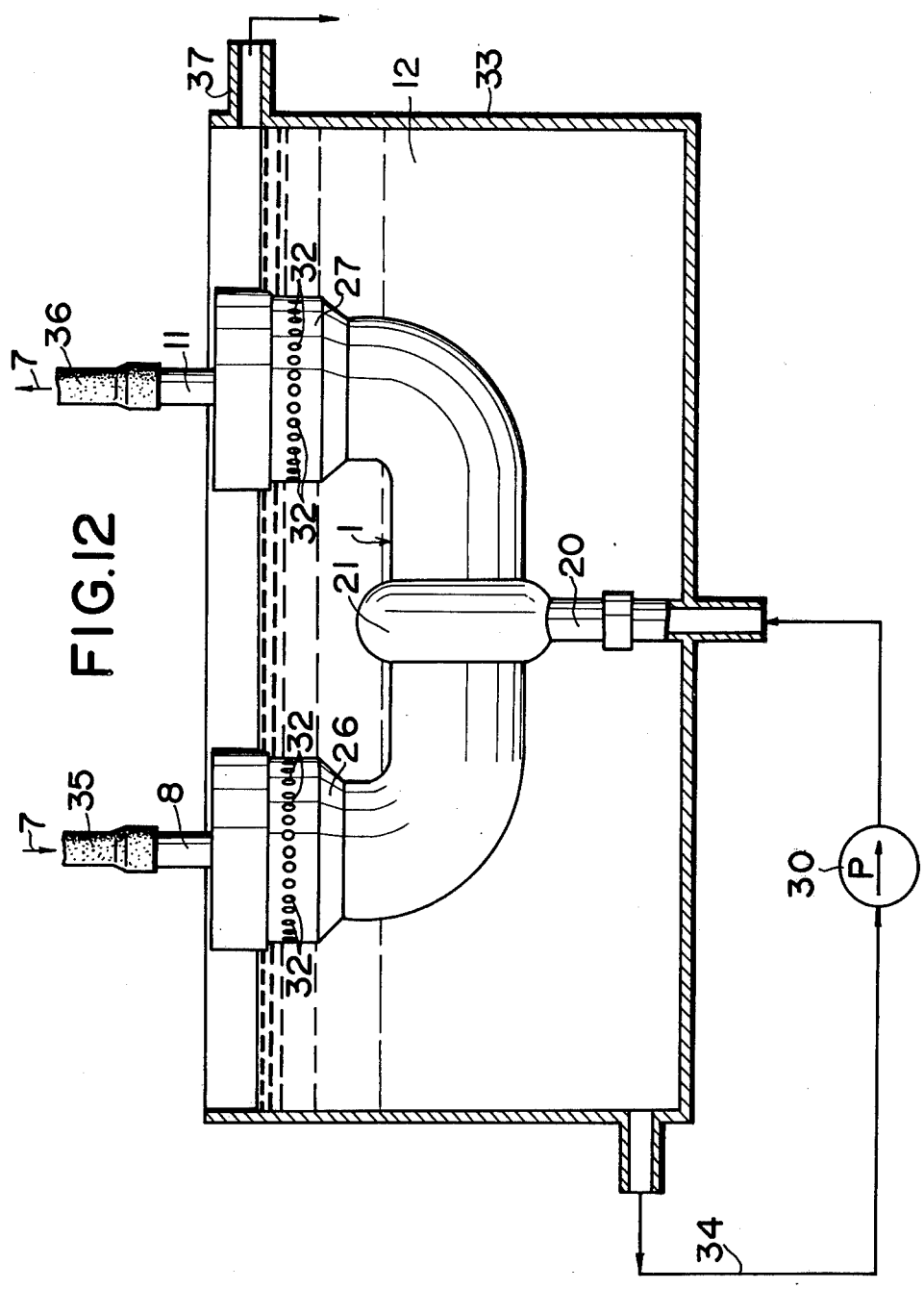

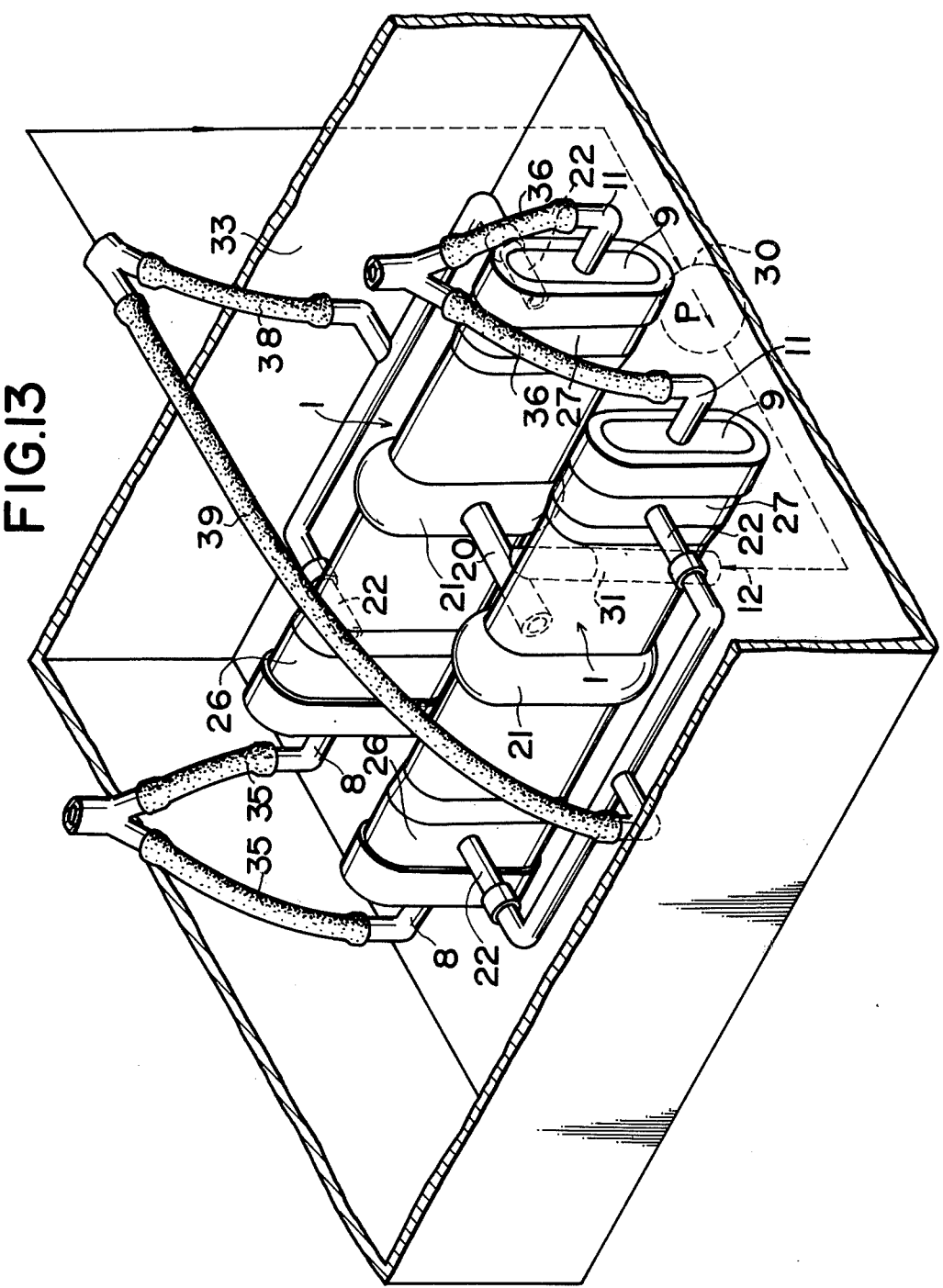

HOLLOW-FIBER PERMEABILITY APPARATUS

BACKGROUND OF THE INVENTION

1. Field of the Invention

This invention relates generally to a hollow-fiber permeability apparatus, and more particularly to a hollow-fiber permeability apparatus in which a permeating region of a housing contains a bundle of hollow fibers, and materials can selectively permeate through the membranes formed by the permeable walls of the hollow fibers, between a fluid flowing along the exteriors of the hollow fibers, and another fluid flowing the interiors of the hollow fibers. The permeation may be based on the principles of osmosis, dialysis, ultrafiltration, reverse osmosis or the like.

2. Description of the Prior Art

For example, a conventional hollow-fiber permeability apparatus is used for blood dialysis in an artificial kindney, in which toxic materials are removed from the blood of a patient suffering from renal failure or medicinal poisoning. Such apparatus is also used in an artificial lung, in which oxygen and carbon dioxide are exchanged with each other to increase the blood oxygen content.

FIG. 1 shows one example of the conventional hollow-fiber permeability apparatus. A cylindrical housing 1 is packed with a bundle 3 of numerous hollow fibers 2. The hollow fibers are fixed at upper and lower ends with potting materials 4. The cut ends of the hollow fibers 2 are open to compartment 6 formed by cover 5. Blood 7 is introduced into the compartment 6 of the housing 1 through an blood inlet tube 8 connected to the upper cover 5. The blood 7 is distributed to the hollow fibers 2, and flows into the interiors of the hollow fibers 2. It is collected into a lower compartment 10 formed by a lower cover 9, and discharged through a blood outlet tube 11 from the housing 1.

On the other hand, dialysate 12 is introduced into the housing 1 through an inlet tube 13 for dialysate formed in the lower end portion of the housing 1, and flows upward along the exteriors of the hollow fibers 2. On the basis of Donnan's membrane equilibrium, metabolic waste or excess ions permeates through the wall membranes of the hollow fibers 2 from blood 7 to dialysate 12, or necessary ions permeates through the wall membranes of the hollow fibers 2 from dialysate 12 to blood 7, due to the concentration differences between blood 7 and dialysate 12. Or water is removed from blood 7 by ultrafilteration. After dialysis, the dialysate 12 is discharged from the housing 1 through an outlet tube 14 for dialysate.

The above described hollow-fiber permeability apparatus is physically beneficial to a patient during dialysis. It is easy to handle, and superior in withstanding pressure. The security is good. Thus, the hollow fiber permeability apparatus has many advantages.

However, 10,000 or more hollow fibers whose outer diameter and inner diameter are about 300 $\mu$ and 250 $\mu$ are closely packed in the housing 1. Accordingly, it is difficult for dialysate to penetrate uniformly through the whole of the bundle 3 of hollow fibers 2. The dialysis efficiency is extremely low in the central portion of the bundle 3. A uniform dialysis cannot be expected.

SUMMARY OF THE INVENTION

Accordingly, it is an object of this invention to provide a hollow-fiber permeability apparatus in which fluid can uniformly flow through a hollow fiber bundle, and thereby an effective membrane area can be increased.

Another object of this invention is to provide a hollow fiber permeability apparatus which is used in an open system on coil type kidney machine and obtains a high dialysis efficiency.

In accordance with one aspect of this invention, in a hollow-fiber permeability apparatus in which a permeating region of a housing contains a bundle of hollow fibers, and materials can selectively permeate through the membranes formed by the permeable walls of the hollow fibers, between a first fluid flowing along the exteriors of the hollow fibers, and another fluid flowing the interiors of the hollow fibers, the improvements which comprises:

(a), at least one first opening and at least on second opening for passing the first fluid, formed in both end portions of the housing;

(b), an enlarged cross-section portion formed between the first and second openings and surrounding substantially the whole circumferential surface of the bundle of hollow fibers in the housing; and (c) at least one third opening for passing the first fluid, connected to the enlarged cross section portion, the first and second openings being used as a fluid inlet opening, and the third opening being used as a fluid outlet opening, or the first and second openings being used as the fluid outlet opening, and the third opening being used as the fluid inlet opening.

The above and other objects, features and advantages of this invention, will be apparent in the following detailed description of illustrative embodiments which are to be read in connection with the accompanying drawings.

BRIEF DESCRIPTION OF THE DRAWINGS

FIG. 8 is a perspective view of a blood dialysis apparatus for artificial kidney according to a third embodiment of this invention;

FIG. 9 is a cross-sectional view of the apparatus of FIG. 8;

FIG. 10 is a vertical-sectional view of a blood dialysis apparatus for artificial kidney according to a fourth embodiment of this invention; and FIG. 11 to FIG. 13 are perspective views of important parts of modifications of the apparatus of FIG. 10.

DESCRIPTION OF THE PREFERRED EMBODIMENTS

Figure 1:
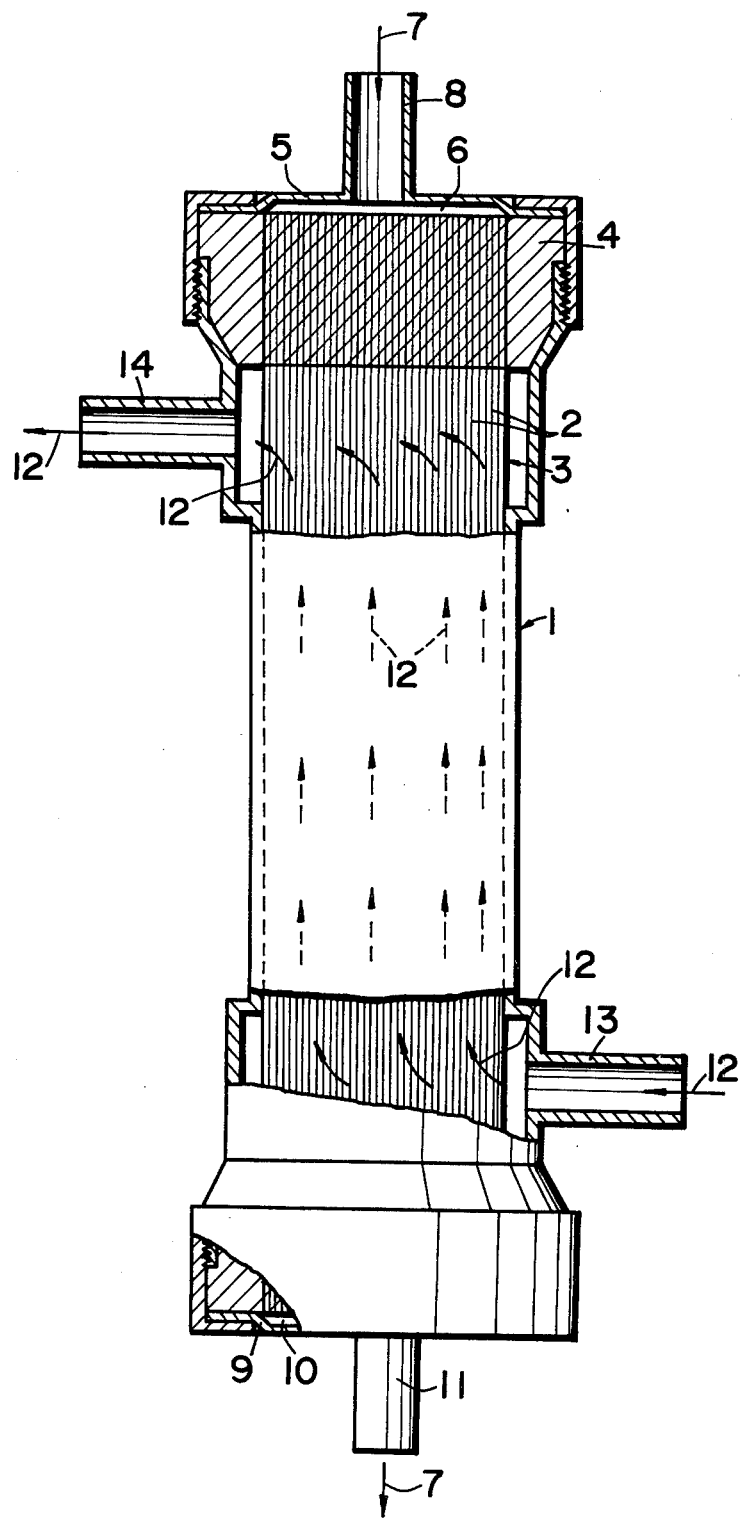
FIG. 1 is a front view of a conventional blood dialysis apparatus for artificial kidney, partly broken away.

Embodiments which will be applied to blood dialysis apparatus (dialyzer) will be described with reference to the drawings. In the embodiment, parts which correspond to the parts in FIG. 1, are denoted by the same reference numerals.

A first embodiment will be described with reference to FIG. 2 to FIG. 6.

A housing 1 is generally cylindrical, similar to the housing 1 of FIG. 1. An enlarged cross-sectional portion 21 is formed in the central portion of the housing 1. An inlet tube 20 for dialysate is connected to the enlarged cross-sectional portion 21 at an inlet opening 24 as shown in FIG. 4. A permeating region 15 is surrounded by the enlarged cross-sectional portion 21 in the direction perpendicular to the length of the permeating region 15. Other enlarged cross-sectional portions 26 and 27 are formed in the upper and lower end portions of the housing 1. Outlet tubes 22 for dialysate are connected to the upper and lower enlarged cross-sectional portions 26 and 27 at outlet openings 28 respectively, as apparently shown in FIG. 3. Dialysate 12 is introduced into the central portion of the housing 1 through the inlet tube 20, and divided into two ways to develop upward and downward flows. Then, dialysate 12 is discharged from the upper and lower outlet tubes 28 for dialysate.

On the other hand, blood 7 from an inlet tube 8 flows the interiors of the hollow fibers 2 countercurrently with the dialysate 12 which flows along the exteriors of the hollow fibers 2, until blood 7 reaches the central portion of the housing 1. Thereafter, blood 7 flows the interiors of the hollow fibers 2 cocurrently with the dialysate and is discharged from an outlet tube 11.

The dialysate introduced is divided into two ways along the circumferential surface of the bundle of the hollow fibers resulting in a uniform distribution in the central enlarged corss-section portion 21. Accordingly, the dialysate 12 is spontaneously flowed into the hollow fiber bundle 3, as shown by arrows in FIG. 3. The dialysate 12 can penetrate well into the central portion of the hollow-fiber bundle 3 which is closely packed in the permeating region 15. As a result, the dialysis efficiency can be remarkably increased in comparison with the conventional dialysis apparatus.

As shown in FIG. 4, a guide plate 23 may be arranged at the inlet opening 24 for dialysate. In this case, the localized dialysate flow in the enlarged cross-section portion 21 is prevented. Moreover, the hollow fibers 2 are free from the damage which might occur with the collision of the rushing dialysate flow at the inlet opening 24. The dialysate 12 can be more uniformly distributed in the enlarged cross-section portion 21 by the aid of a guide plate. In FIG. 4, the dialysate 12 is guided in the one direction along the circumferential surface of the hollow fiber bundle 3 by the guide plate 23. One modification of the guide plate 23 is shown in FIG. 5. In this modification, the dialysate 12 is guided in the opposite directions along the circumferential surface of the hollow fiber bundle 3.

Figure 2:
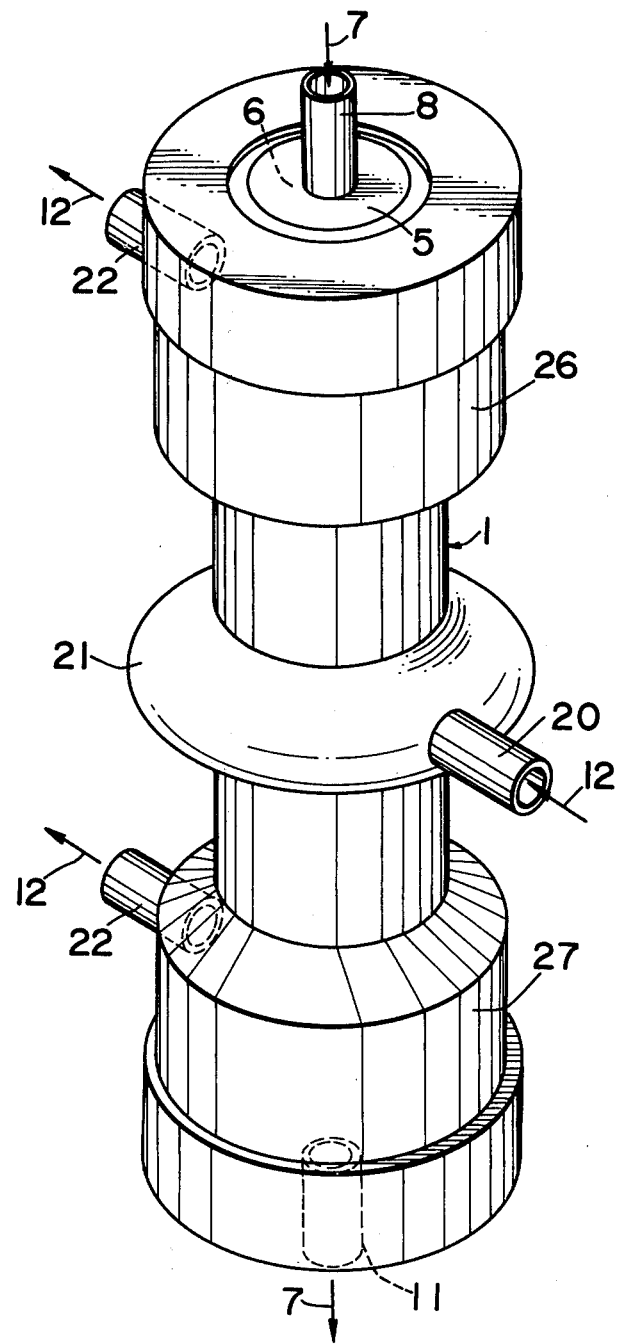
FIG. 2 is a perspective view of a blood dialysis apparatus for artificial kidney according to a first embodiment of this invention.
Figure 3:
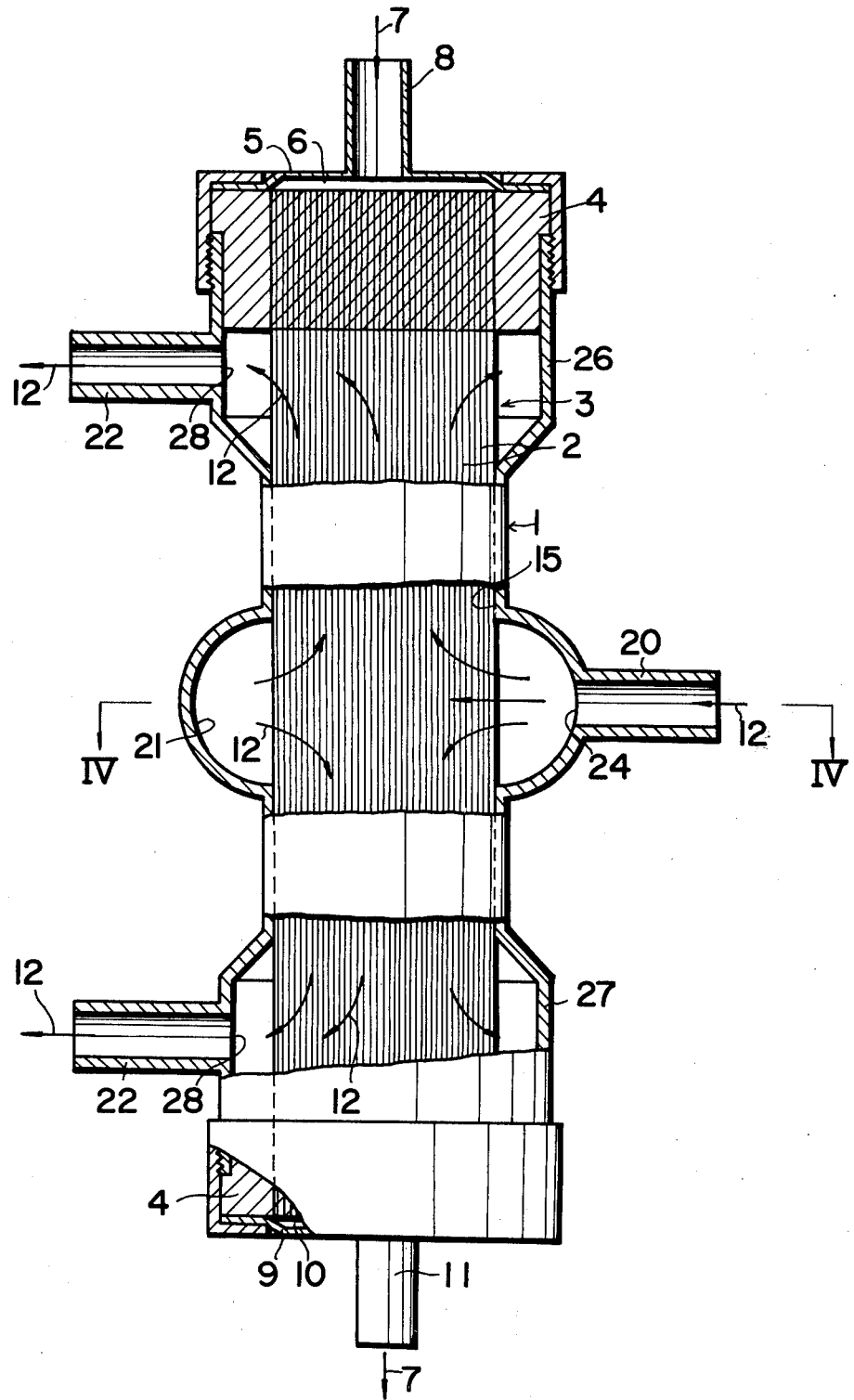
FIG. 3 is a vertical-sectional view of the apparatus of FIG. 2.
Figure 4:
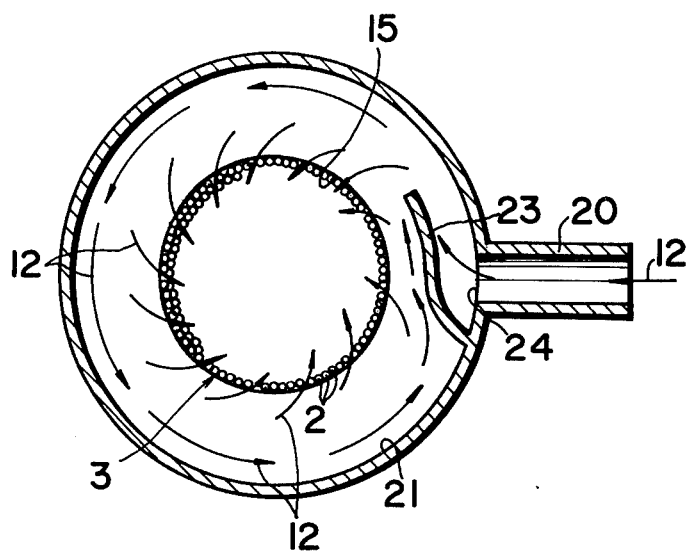
FIG. 4 is a cross-sectional view taken along the line IV—IV of FIG. 3.
Figure 5:
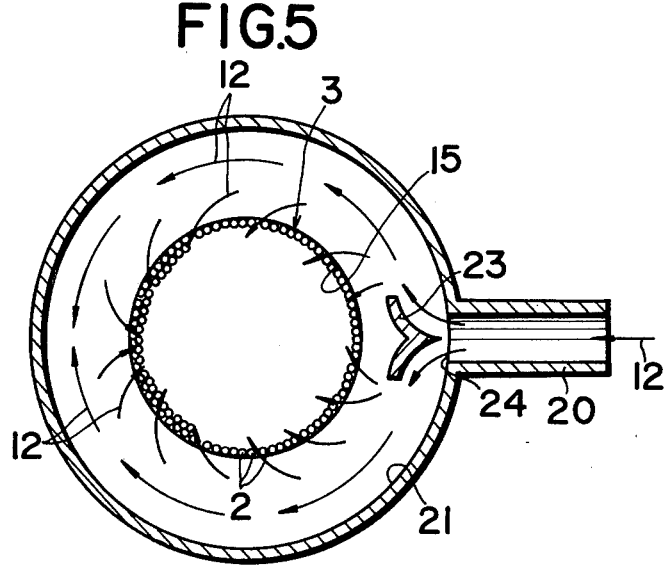
FIG. 5 is a cross-sectional view of one modification of FIG. 4.
Figure 6:
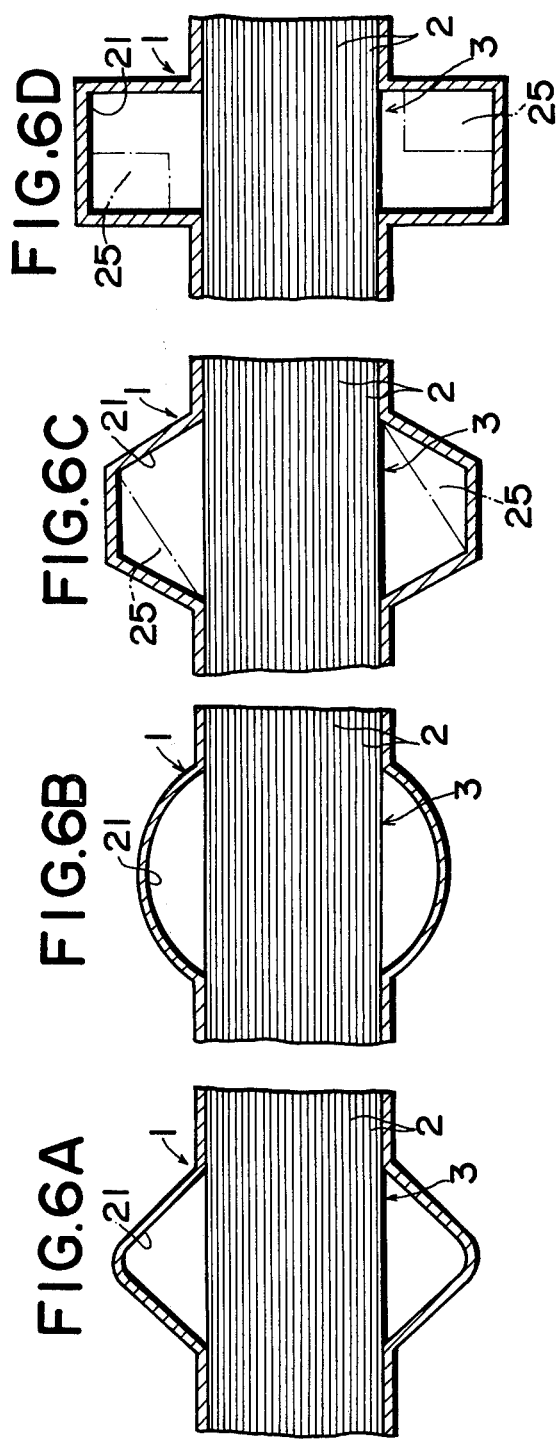
FIG. 6A to FIG. 6D are vertical-sectional views of important parts of modifications of the cross-sectional portion of the apparatus of FIG. 2.

Preferably, the enlarged cross-section portion 21 extends perfectly over the whole circumferential surface of the hollow fiber bundle 3, as shown in FIG. 2, FIG. 3 and FIG. 4. However, that is not always needed.

FIG. 6A to FIG. 6D show different modifications in the shape of the enlarged cross-section portion 21.

In the practical use of this invention, the outer diameter, length and number of the hollow fibers 2 are not particularly limited. The preferable results can be generally obtained, when the outer diameter, length and number of hollow fibers 2 are less than 1000 $\mu$, 100 to 600 mm and 2000 to 20,000, respectively. When the outer diameter of the hollow fibers 2 is more than 1000 $\mu$, the total membrane area of the hollow fibers 2 per unit volume of the permeating region 15 is reduced, resulting in lower dialysis efficiency per unit volume. The hollow fibers 2 having the larger outer diameter are liable to be deformed with the dialysate flowing at a high rate along the exteriors of the hollow fibers 2. The flow resistance of the blood is increased with the deformation of the hollow fibers 2. That is not preferable. When the number of the hollow fibers 2 is less than 2000, a satisfactory performance cannot be obtained, since the total membrane area is insufficient. And when the number of the fibers 2 is more than 20,000, the flow distribution is in-sufficient in the whole of the hollow fiber bundle 3 and the fluid flowing the exteriors of the hollow fibers is unable to perfuse satisfactorily along the whole membranes of the hollow fibers, in the interiors of which other fluid is flowing.

When the apparatus according to this embodiment is used as a blood dialysis apparatus, the outer diameter, length and number of the hollow fibers 2 are limited by other factors such as viscosity of blood, coagulating property of blood, allowable extracorporeal volume (generally 3000 ml) of blood from a patient during dialysis, and pressure losses due to the flow resistances of the flows. In that case, preferabley, the outer diameter, length and number of the hollow fibers are 100 to 600 $\mu$, 200 to 600 mm and 4000 to 20,000, respectively for blood dialyzer. The thickness of the membranes of the hollow fibers 2 is preferably 10 to 50 $\mu$. Such a range is most effective for most cases. However, the preferable thickness of the membranes of the hollow fibers 2 depends on the permeability and mechanical strength of the hollow fibers 2. Accordingly, hollow fibers having the thickness beyond the above range can be used, as occasion demands.

Epoxy resin, urethane resin, silicon resin, phenol aldehyde resin, thermo-setting synthetic rubber and acrylic acid resin can be used as the potting material 4 for fluid-tightly setting both ends of the hollow fiber bundle 3. Epoxy resin is inactive to solvent and chemical erosion. At the normal pressure and temperature, the potting material 4 of urethane resin is superior in the fluid-tight sealing ability.

Since the potting material 4 directly contacts with blood during the blood dialysis, it should have anticoagulating property and be intoxic. From such a view point, silicon resin and urethane resin are more preferable.

Using the apparatus of FIG. 2 to FIG. 4, an experiment was made on the dialysis efficiency. The cross-section of the permeating region 15 was circular. The permeating region 15 was occupied with 7500 cellulose hollow fibers having the inner diameter of 216 $\mu$, the membrane thickness of 16 $\mu$ and the length of 200 mm. Urea was dissolved into distilled water to prepare a urea solution having the concentration of 1.2 mg/ml. The urea solution was flowed inside the hollow fibers 2 at the rate of 200 ml/min. A commercial dialysate was flowed along the exteriors of the hollow fibers 2 at the flow rate of 500 ml/min. After five minutes dialysis, the urea removing rate of 79% was obtained. The effective membrane area of the hollow fiber 2 was 1.0 m².

In the control experiment using the conventional dialysis apparatus of FIG. 1 under the same experimental conditions, the urea removing rate was 60%. It will be understood that the apparatus according to this embodiment is superior to the conventional type in dialysis efficiency. Accordingly, a short time dialysis can be possible with the apparatus according to this embodiment. In another sense, the apparatus can be smaller in size for the same dialysis efficiency as the conventional apparatus, resulting in the smaller priming volume of the apparatus. That is a big advantage for a patient during dialysis to keep him well-being.

Figure 7:
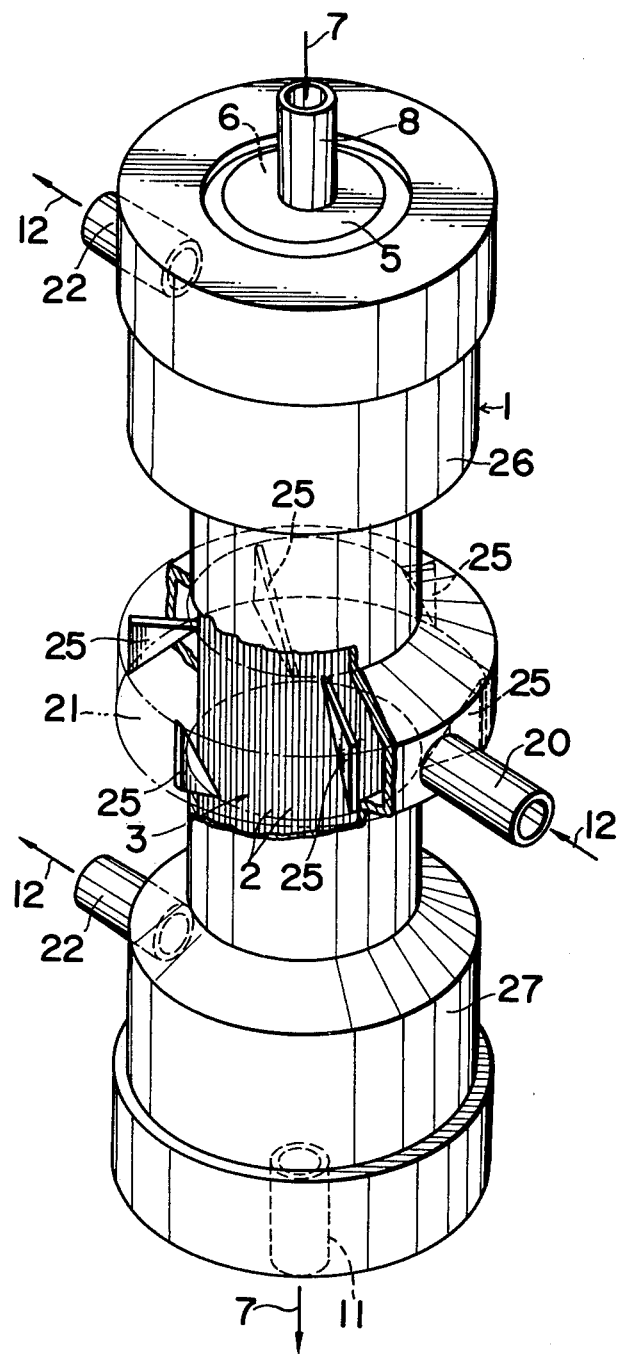
FIG. 7 is a perspective view of a blood dialysis apparatus for artificial kidney according to a second embodiment of this invention, partly broken away.

Next, a second embodiment of this invention will be described with reference to FIG. 7. In this embodiment, disturbing plates 25 are alternately arranged in the central enlarged cross-section portion 21. The cross-section of the enlarged cross-section portion 21 is substantially trapezoid. The disturbing plates 25 extend substantially along the length of the hollow fibers 2. The disturbing plates 25 are shown by the dot-dash lines in FIG. 6C.

Turbulent flows of dialysate 12 are developed with the disturbing plates 25 in the enlarged cross-section portion 21, and so dialysate 12 is uniformly distributed along the whole circumferential surface of the hollow fiber bundle 3 in the central enlarged portion 21. The dialysate 12 flows into the central portion of the hollow fiber bundle 3. As a result, the dialysis efficiency can be remarkably improved.

The disturbing plates 25 do not always need to extend in parallel with the length of the hollow fiber bundle 3. They may be obliquely arranged to the length of the hollow fiber bundle 3, so as to lead the dialysate 12 smoothly into the hollow fiber bundle 3. An experiment on the dialysis efficiency was carried out under the same conditions as for the first embodiment, using the apparatus according to the second embodiment in which the inclination angle of the disturbing plates 25 was 30° to the length of the hollow fiber bundle 3 and the number of the disturbing plates 25 was six. After 5 minutes dialysis, the removing efficiency of urea was 82%. Thus, the effect of the distrubing plates 25 was confirmed for the dialysis performance.

In this embodiment, the disturbing plates 25 are flat, but they may be suitably curved.

An experiment was made on the dialysis efficiency, using the apparatus which includes the central enlarged cross-section portion 21 shown in FIG. 6D. The cross-section of the central enlarged cross-section portion 21 is rectangular. Eight rectangular disturbing plates 25 are alternately arranged in the central enlarged cross-section portion 21. After 5 minute dialysis, the urea removing rate of 80% was obtained. It was confirmed that the penetration of dialysate 12 into the hollow fiber bundle 3 was more improved with the arrangement of the disturbing plates 25.

Next, a third embodiment of this invention will be described with reference to FIG. 8 and FIG. 9.

According to this embodiment, the cross-sections of the housing 1 and the permeating region 15 for the hollow fiber bundle 3 are flat. The enlarged cross-section portion 21 is formed in the central portion of the housing 1. The inlet tube 20 for dialysate is connected to the enlarged cross-section portion 21. The hollow fibers 2 are flat packed in the housing 1. Accordingly, it is much easier that the dialysate 12 perfuses into the central portion of the hollow fiber bundle 3.

An experiment was made on the dialysis efficiency, using the apparatus of FIG. 8. The flatness of the housing 1, namely, the ratio of the thickness of the housing to the width thereof was 1 : 6. The permeating region 15 was occupied with 7500 cellulose hollow fibers 2. The packing density was 48%. The inner diameter and thickness of the hollow fibers 2 were 216 $\mu$ and 16 $\mu$, respectively. After 5 minutes dialysis, the urea removing rate of 87% was obtained. Thus, it was proved that the dialysis efficiency was further improved by using the flat housing 1 in comparison with the experimental results for the apparatus according to the first and second embodiments of this invention.

For comparison, an apparatus without the central enlarged cross-section portion was manufactured. The other constructions were the same as those of FIG. 8. In this apparatus, the dialysate is introduced from an inlet tube connected to one end of the housing and discharged from an outlet tube connected to the other end of the housing. The experiment was made on the dialysis efficiency, using the apparatus. The urea removing rate was found to be 68%.

The dialysate 12 does not always need to be introduced from the central portion of the housing and discharged from both end portions of the housing. On the contrary, it may be introduced from both end portions of the housing and discharged from the central portion of the housing. For example, in the apparatus of FIG. 8, the dialysate 12 was introduced from the outlet tubes 22 at both ends of the housing 1 and discharged from the inlet tube 20 connected to the central enlarged cross-section portion 21. The direction of the dialysate flow was opposite to that of the first embodiment. The dialysate was first introduced and distributed around the hollow fiber bundle 3 in the enlarged cross-section portions 26 and 27. After perfusing the exterior of the fibers, it was collected into the central enlarged cross-section portion 21, and discharged from the inlet tube 20. In this experiment, the satisfactory dialysis-efficiency was also obtained. The urea removing rate was 86% under the same conditions as described for the above experiments.

In the apparatus shown in FIG. 8, at least one constricted portion or convex portion toward the interior of the housing 1 may be formed in the upper and lower walls of the housing 1 along the length of the housing. Namely, the cross-section of the housing 1 may be guitar-shaped. The uniform packing density of the hollow fibers 2 in the permeating region can be maintained by function of the convex portions because the constricted portion will prevent the localization of the fibers in the permeating region. Moreover, the dialysate can more easily perfuse into the central portion of the hollow fiber bundle 3 from the convex portions. The dialysis efficiency can be further improved.

Next, a fourth embodiment of this invention will be described with reference to FIG. 10 to FIG. 13.

A so-called "coil type" artificial kidney apparatus has been marketed in which permeable tubes are wound on a cylindrical core together with meshes of synthetic resin. Inlet and outlet portions for blood are connected to both ends of the tubes. The apparatus is dipped into a larger bath, and dialysate is introduced from the bottom of the cylindrical core to perfuse the membranes of the tubes. An apparatus according to this embodiment used on the coil type machine is shown in FIG. 10. The operation is the same as that for the coil type artificial kidney apparatus.

In the apparatus of FIG. 10, dialysate 12 is supplied to the inlet opening through the inlet tube 20 for dialysate by a recirculating pump 30, and is uniformly distributed in the central enlarged cross-section portion 21. The dialysate 12 divides into the rightward and leftward flows, penetrates and perfuses into the hollow fiber bundle 3 to the enlarged cross-section portions 26 and 27. The enlarged cross-section portions 26 and 27 have numerous small round openings 32 from which the dialysate 12 is discharged into a dialysate bath 33. The dialysate 12 is recirculated through a circulation pipe 34 by the pump 30. An excess of the dialysate increased with the ultrafilteration and the supply of the fresh dialysate through a supply tube 40 overflows through a pipe 37 from the dialysate bath 33. On the other hand, blood 7 is flowed into the interiors of the hollow fibers 2 through a blood inlet tube 35, dialyzed through the membranes of the hollow fibers 2 and returned through a blood outlet tube 36 into the patient's body during dialysis.

In this embodiment, the dialysate 12 supplied by the pump 30 is also effectively penetrated into the hollow fiber bundle 3 by function of the central enlarged cross-section portion 21. An excellent dialysis performance is obtained.

The cross-section of the housing 1 is circular in this embodiment. However, it may be as flat as the apparatus of FIG. 8. The dialyzer can be used in the same manner as the coil-type artificial kidney apparatus. In the apparatus of FIG. 10, a fresh dialysate 12 may be supplied through a flow meter 41 and a supply tube 40 into the recirculating dialysate in the circulation pipe 34. Moreover, a part of the recirculating dialysate may be discharged from the circulation pipe 34 through a discharge valve 42.

FIG. 11 shows one modification of the apparatus of FIG. 10. In this modification, the cross-section of the housing 1 is flat. The inlet tube 20 for dialysate is bifurcated. Numerous small openings 32 are made in the central enlarged cross-section portion 21. The dialysate 12 is introduced into the housing 1 through the bifurcated inlet tube 20 from both ends of the housing 1, and discharged from the central enlarged cross-section portion 21 through the opennings 32.

FIG. 12 shows another modification of the apparatus of FIG. 10. The housing 1 is U-shaped. Accordingly, the dialysate bath 33 containing the housing 1 can be smaller.

FIG. 13 shows a still another modification of the apparatus of FIG. 10. In this modification, an apparatus contained in the dialysate bath 33 includes a pair of housings 1. Dialysate 12 is introduced into a pair of central enlarged cross-section portions 21 through a T-shaped inlet tube 20 by the pump 30, and discharged through tubes 38 and 39 connected to a pair of bifurcated outlet tubes 22 which are, in turn, connected to pairs of enlarged cross-section portions 26 and 27. When the dialysate side is conditioned to be in negative pressure, water can be removed from blood 7 by the principle of ultrafiltration. Numerous small openings may be made in the enlarged cross-section portions 26 and 27. In this case, the bath 33 is filled with dialysate. Dialysis is effectively operated in a so-called "open system".

While preferred embodiments have been described, variations thereto will occur to those skilled in the art within the scope of the present inventive concepts which are delineated by the following claims.

The embodiments have been described as used for dialysis between two liquids. Embodiments of the invention may be applied to the movement of material between liquid and gas, or between gas and gas through the hollow fiber membranes. Moreover, such embodiments may be used not only as a blood dialysis apparatus, but also for blood oxygen addition apparatus in an artificial lung, in which the blood flows along the inside of the hollow fibers, while the gas or the liquid containing oxygen flows along the outside of the hollow fibers. Also embodiments may be used for desalination and purification of water by reverse osmosis, manufacturing processes for foods such as condensation of juice, removal of yeast in beer, and so on.

What is claimed is:

1. In a hollow-fiber dialysis apparatus including a housing, a permeating region of the housing containing a bundle of hollow fibers, means for introducing a fluid for passage through the interiors of the fibers, and means for introducing a dialysate which flows around the exterior of the fibers whereby materials can selectively permeate through the fiber walls based on the principle of dialysis, the improvement comprising:
    (a) at least one first opening and at least one second opening for passing said dialysate, said openings being formed in opposite end portions of said housing;
    (b) an enlarged cross-section portion of said housing formed between said first and second openings and surrounding substantially the whole circumferential surface of said bundle of hollow fibers in said housing; and
    (c) at least one third opening for passing said dialysate, said third opening being connected to said enlarged cross-section portion, said openings providing inlet and outlet openings, said dialysate thereby simultaneously flowing in separate paths between said third opening and each of the first and second openings while contacting the exteriors of said fibers.

2. The apparatus according to claim 1, in which said dialysate is introduced into said housing through said third opening, and dischrged from said housing through said first and second openings.

3. The apparatus according to claim 2, in which a guide plate is arranged adjacent to said third opening in said enlarged cross-section portion to direct said dialysate along said enlarged cross-section portion.

4. The apparatus according to claim 2, in which a guide plate is arranged adjacent to said third opening in said enlarged cross-section portion to divide said dialysate into two paths and to direct said dialysate along said enlarged cross-section portion.

5. The apparatus according to claim 1, in which said dialysate is introduced into said housing through said first and second openings, and discharged from said housing through said third opening.

6. The apparatus according to claim 1, in which the cross-section of said housing in the direction perpendicular to the length of said hollow fibers is substantially circular.

7. The apparatus according to claim 1, in which the cross-section of said housing in the direction perpendicular to the length of said hollow fibers. is noncircular.

8. The apparatus according to claim 1, in which the cross-section of said enlarged cross-section portion in the direction of the length of said hollow fibers is arcuate.

9. The apparatus according to claim 1, in which the cross-section of said enlarged cross-section portion in the direction of the length of said hollow fibers is substantially triangular.

10. The apparatus according to claim 1, in which the cross-section of said enlarged cross-section portion in the direction of the length of said hollow fibers is polygonal.

11. The apparatus according to claim 1, in which the cross-section of said enlarged cross-section portion in the direction of the length of said hollow fibers is substantially trapezoid.

12. The apparatus according to claim 1, in which the cross-section of said enlarged cross-section portion in the direction of the length of said hollow fibers is substantially rectangular.

13. The apparatus according to claim 1, in which at least one disturbing plate is arranged in said enlarged cross-section portion to develop a turbulent flow of said fluid.

14. The apparatus according to claim 13 including a plurality of disturbing plates, said disturbing plates having a substantially triangular shape and being positioned in alternately opposed positions and in spaced relationship around said enlarged cross-section portion.

15. The apparatus according to claim 13 including a plurality of disturbing plates, said disturbing plates having an essentially rectangular shape and being positioned in alternately opposed positions and in spaced relationship around said enlarged cross-section portion.

16. The apparatus according to claim 1, in which said housing consists of plural housing units combined with each other so as to develop parallel flows of said dialysate in said housing.

17. The apparatus according to claim 16, in which the enlarged cross-section portions of said housing units are connected to each other, and a pipe connected to both end portions of each of said housing units, at least one part of said dialysate being recirculated through said pipe and said enlarged cross-section portions.

18. The apparatus according to claim 16, in which said housing units are placed in said bath, said enlarged cross-section portions of said housing units being connected to each other, and openings communicating with said bath formed in both end portions of said housing units, said dialysate being recirculated to said enlarged cross-section portions connected to each other from said bath.

19. The apparatus according to claim 16 including a bath surrounding said housing units, a pipe connecting the housing units, said pipe being connected to end portions of the housing units and communicating said end portions with each other, said pipe delivering dialysate to said end portions for receipt by said housing units, the enlarged cross-section portions of the respective housing units having openings communicating with said bath whereby said dialysate is discharged from the housing units into the bath, and means connecting the bath to said pipe whereby said dialysate is recirculated to said pipe.

20. The apparatus according to claim 1 including a bath surrounding said housing, the outlet opening for said dialysate communicating with said bath whereby the dialysate is discharged into the bath.

21. The apparatus according to claim 20, in which said housing is U-shaped.

22. The apparatus according to claim 20, in which said fluid is recirculated from said bath to said first and second openings, or said third opening being used as said dialysate inlet opening.

* * * * *